3,217,002
PHENYLTHIONOCARBAMATES
Anton G. Weiss, Basel, Switzerland, assignor to Monsanto Company, a corporation of Delaware
No Drawing. Filed Apr. 2, 1962, Ser. No. 184,486
15 Claims. (Cl. 260—247.1)

This application is a continuation-in-part of now abandoned copending applications Serial No. 736,968, filed May 22, 1958, Serial No. 843,646, filed October 1, 1959, Serial No. 843,948, filed October 2, 1959 and Serial No. 844,195, filed October 5, 1959.

The present invention relates to phenylthionocarbamates, to biologically active compositions containing them as an essential active ingredient and to methods of using such biologically active compositions. More particularly, the invention relates to phenylthionocarbamates which contain in the phenyl radical substituents which support biological activity. The biological activity is further supported by a heterocyclic radical containing the nitrogen of the thionocarbamic acid radical.

General objects of the invention are to provide useful new compounds, especially compounds which are toxic to living plants and to provide methods for their use to accomplish various desirable results. A further object is to provide compositions and methods for the destruction of noxious vegetation. Another object is to destroy weeds in the form of germinating seedlings. Another object is to destroy weeds by applying a toxic concentration of the new compounds to foliage after emergence. Still another object is to provide new compounds which are outstandingly effective herbicides and to provide methods for manufacture of such compounds. A particular object of the invention is to provide herbicides characterized by high unit activity and specificity for the control of weeds in the most prevalent broadleaf weed families and weedy grass families. A further object is to provide new fungicides.

An important segment of the new compounds are the mono-, di- and trihalogenated phenyl esters which may be represented by the general formula

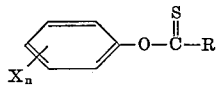

where X represents halogen, preferably chlorine, $n$ represents an integer from 1 to 3 inclusive and R is a heterocyclic amino radical nitrogen of which is attached to the thiocarbonyl group. The presence of halogen in the phenyl radical is essential for obtaining the desired properties and, in general, so is the heterocyclic amino radical. Tetra- and pentahalogen substituted phenyl esters are less desirable.

In addition to halogen, a lower alkyl group in the phenyl ring is permitted. Phenyl radicals so substituted include p-chloro-o-tolyl, o-chloro-p-tolyl and 2-bromo-4-butylphenyl. The butyl radical may be primary, secondary or tertiary and bromine may be replaced by chlorine. In other words, the halogen may be a middle halogen. In the case of dihalophenyl radicals 2,4-orientation is preferred but R should not contain oxygen unless the halogens are chlorine. In the monohalophenyl series it was demonstrated that the halogen could be chlorine, bromine or fluorine but could not be p-bromophenyl when R was dimethylmorpholino. The terms "morpholino" and "piperidino" refer only to radicals having the free valence on the nitrogen in accordance with accepted usage and in the interest of uniformity the terms "pyrrolidino," "N-methylpiperazino" and "hexamethylenimino" will be employed herein to designate that substitution is in the 1-position.

The invention will be more readily understood from typical examples of the preferred compounds which comprise o-, m- and p-chlorophenyl, o-, m- and p-bromophenyl, o-, m- and p-fluorophenyl, 2,4-dichlorophenyl, 2,4-difluorophenyl, 3,4-dichlorophenyl, 3,5-dichlorophenyl and 2,3-dichlorophenyl esters of 4-morpholinecarbothionic acid; 2,3,4-trichlorophenyl, 2,3,4-tribromophenyl, 2,3,5-trichlorophenyl, 2,3,5-tribromophenyl, 2,4,5-tribromophenyl, 2,4,5 - trifluorophenyl, 2,3,6 - trichlorophenyl, 2,3,6 - tribromophenyl, 2,4,6 - trichlorophenyl, 2,4,6 - tribromophenyl and 2,4,6 - trifluorophenyl esters of 1 - pyrrolidinecarbothionic acid. Further examples are the p-chlorophenyl esters of the following:

1-piperidinecarbothionic acid,
3-ethyl-4-morpholinecarbothionic acid,
3-methyl-4-morpholinecarbothionic acid,
4-methyl-1-piperidinecarbothionic acid,
2-methyl-1-piperidinecarbothionic acid,
1-pyrrolidinecarbothionic acid,
5-ethyl-2-methyl-1-piperidinecarbothionic acid,
5-ethyl-3-methyl-1-piperidinecarbothionic acid,
5-methyl-3-ethyl-1-piperidinecarbothionic acid,
2,4,6-trimethyl-1-piperidinecarbothionic acid,
2,6-dimethyl-4-morpholinecarbothionic acid,
3,5-dimethyl-4-morpholinecarbothionic acid and
4-methyl-1-piperazinecarbothionic acid.

Although other methods of syntheses are applicable the new compounds are probably most readily obtained by condensing a halogen substituted phenol with an aminocarbonyl halide containing the desired acid radical. The detailed examples below fully describe this phase of the invention but the invention is not limited thereto.

EXAMPLE 1

A solution was prepared by admixing 32.1 grams (0.25 mole) of p-chlorophenol, 150 ml. of benzene and 30 ml. of triethylamine. To the solution so prepared was added slowly 41.4 grams (0.25 mole) of 4-morpholinethiocarbonyl chloride. The exothermic reaction caused a temperature rise from 27 to 35° C. The reaction mixture was refluxed overnight, cooled and diluted with 250 ml. of water. The solution was extracted with 250 ml. of ether, the ether extract washed with water three times and dried over sodium sulfate. The product was filtered through clay and the solvent removed by distillation in vacuo at 100° C. (approximately 14 mm. Hg). The residue, 58 grams of a semi-solid, was added to 50 ml. of ethanol and the mixture heated. The portion insoluble in ethanol was separated by filtering the hot mixture. The p-chlorophenyl 4-morpholinecarbothionate was recovered from the filtrate as a pale yellow solid melting at 103–106° C. Analysis gave 5.7% nitrogen, 12.8% sulfur and 13.8% chlorine as compared to 5.4% nitrogen, 12.4% sulfur and 13.8% chlorine calculated for $C_{11}H_{12}ClNO_2S$.

EXAMPLE 2

In the procedure of Example 1, 40.7 grams (0.25 mole) of 2,4-dichlorophenol was substituted for the p-chlorophenol. The 2,4-dichlorophenyl 4-morpholinecarbothionate was a pale yellow solid melting at 86–88° C. Analysis gave 4.7% nitrogen as compared to 4.8% calculated for $C_{11}H_{11}Cl_2NO_2S$.

EXAMPLE 3

A solution was prepared by admixing 43.2 grams (0.25 mole) of p-bromophenol, 150 ml. of benzene and 30 ml. of triethylamine. To the cooled solution so prepared was added slowly 41.4 grams (0.25 mole) of morpholinethiocarbonyl chloride and the mixture refluxed overnight. The produce was washed with 2 N NaOH and then diluted with 150 ml. of water. The solution was extracted with 250 ml. of ether and the organic layer washed with water and dried over sodium sulfate. The product was filtered through clay and the solvent removed by distillation in vacuo at 100° C. After recrystallizing from ethanol the p-bromophenyl 4-moropholinecarbothionate was an amber solid melting at 97–100° C. Analysis gave 10.2% sulfur and 4.9% nitrogen as compared to 10.6% sulfur and 4.7% nitrogen calculated for $C_{11}H_{12}BrNO_2S$.

EXAMPLE 4

To a stirred solution containing 32.4 grams (0.25 mole) of o-chlorophenol and 40 grams (0.25 mole) of 25% sodium hydroxide was added in one portion at 25–30° C. a solution of 46 grams (0.25 mole) of 88% 4-morpholinethiocarbonyl chloride in 50 ml. of acetone. After stirring the mixture for 4 hours at room temperature, 250 ml. of water were added and the solution extracted with 250 ml. of ether. The ether extract was washed with water and dried over sodium sulfate. The solvent was removed in vacuo at a maximum temperature of 100° C. at 14 mm. pressure. The o-chlorophenyl 4-morpholinecarbothionate was obtained as a yellow solid. After recrystallizing from a solution of ethanol and water it melted at 56–57° C. Analysis gave 13.8% chlorine, 13.0% sulfur and 5.3% nitrogen as compared to calculated values of 13.8% chlorine, 12.4% sulfur and 5.5% nitrogen.

The physical properties of other typical examples prepared in similar manner to Example 4 are summarized below:

Table I

| Example No. | Compound | Physical Appearance | | Analysis, percent | |
|---|---|---|---|---|---|
| | | | | Calcd. | Found |
| 5 | p-Chlorophenyl 1-piperidine-carbothionate. | Solid M.P. 45–46° C. | Cl | 13.8 | 14.2 |
| | | | S | 12.5 | 12.8 |
| 6 | 2,4-dichlorophenyl 1-piperidinecarbothionate. | Solid M.P. 65–66° C. | Cl | 24.4 | 24.6 |
| | | | S | 11.0 | 11.7 |

EXAMPLE 7

To a stirred solution containing 32.1 grams (0.25 mole) of p-chlorophenol and 40 grams (0.25 mole) of 25% sodium hydroxide was added in one portion at room temperature 48.4 grams (0.25 mole) of 4-(2,6-dimethyl)morpholinethiocarbonyl chloride in 50 ml. of acetone. The temperature rose to 40–45° C. and was kept there by cooling. When the temperature started to drop the ice bath was removed, the product stirred for 5 hours at room temperature and then 250 ml. of water added. The solution was filtered and the solid washed with water and dried on a porous plate. The p-chlorophenyl 4-(2,6-dimethyl)morpholinecarbothionate was obtained in 56% yield as a tan solid melting at 117–118° C. after recrystallization from ethanol/water. Analysis gave 12.5% chlorine, 11.4% sulfur and 5.0% nitrogen as compared to 12.4% chlorine, 11.2% sulfur and 4.9% nitrogen calculated.

EXAMPLE 8

To a stirred solution containing 16.8 grams (0.15 mole) of p-fluorophenol and 24.0 grams (0.15 mole) of 25% sodium hydroxide was added in one portion at 25° C. a solution of 27.6 grams (0.15 mole) of 88% 4-morpholinethiocarbonyl chloride in 80 ml. of acetone. The temperature was allowed to rise to 45° C. but was kept from rising higher by cooling in an ice bath. After cooling to room temperature the mixture was stirred for 5 hours at room temperature, 250 ml. of water then added, the solid filtered, washed with water and air dried. The p-fluorophenyl 4-morpholinecarbothionate was obtained in 77.2% yield as a white solid. It melted at 100–102° C. after recrystallization from ethanol. Analysis gave 13.3% sulfur and 5.8% nitrogen as compared to 13.3% sulfur and 5.8% nitrogen calculated.

The physical properties of other typical examples prepared in similar manner to Example 8 are summarized below:

Table II

| Example No. | Compound | Physical Appearance | | Analysis, percent | |
|---|---|---|---|---|---|
| | | | | Calcd. | Found |
| 9 | 2,4-dibromophenyl 1-pyrrolidinecarbothionate. | Tan solid M.P. 79–81° C. | Br | 43.8 | 43.4 |
| | | | S | 8.8 | 9.0 |
| 10 | 2,4,5-trichlorophenyl 1-pyrrolidinecarbothionate. | Tan solid M.P. 91–92° C. | Cl | 34.2 | 34.4 |
| | | | S | 10.3 | 10.3 |
| 11 | 2,4,6-trichlorophenyl 1-pyrrolidinecarbothionate. | Tan solid M.P. 116–118° C. | Cl | 34.2 | 34.4 |
| | | | S | 10.3 | 10.3 |
| 12 | p-Chlorophenyl 1-pyrrolidinecarbothionate. | Tan solid [1] M.P. 75–76° C. | Cl | 14.7 | 15.1 |
| | | | S | 13.3 | 12.7 |

[1] Dried on porous plate.

EXAMPLE 13

To a stirred solution containing 34.6 grams (0.2 mole) of p-bromophenol and 32.0 grams (0.2 mole) of 25% sodium hydroxide was added in one portion at 25° C. a slurry of 29.9 grams (0.2 mole) of 1-pyrrolidinethiocarbonyl chloride in 80 ml. of acetone. The temperature rose to 45° C. but was kept from rising higher by cooling in an ice bath. After cooling to room temperature the mixture was stirred for 5 hours at room temperature and then 250 ml. of water added. The solution was then extracted with 250 ml. of ether, the ether extract washed with water, dried over sodium sulfate and the solvent stripped at a maximum temperature of 100° C. at 14 mm. pressure. The oil obtained was added to 5 ml. of ethanol and the insoluble portion which separated as a semi-solid was dried on a porous plate. The p-bromophenyl 1-pyrrolidinecarbothionate so obtained was a tan solid melting at 65–67° C. after recrystallization from ethanol. Analysis gave 27.9% bromine and 11.0% sulfur as compared to calculated values of 27.9% bromine and 11.2% sulfur.

EXAMPLE 14

To a stirred solution containing 32.6 grams (0.2 mole) of 2,4-dichlorophenol and 32.0 grams (0.2 mole) of 25% sodium hydroxide was added in one portion at 25° C. a solution of 38.7 grams (0.2 mole) of 4-(2,6-dimethyl)-morpholine thiocarbonyl chloride in 80 ml. of acetone. The temperature rose to 45° C. but was kept from rising higher by cooling in an ice bath. After cooling to room temperature the mixture was stirred for 5 hours at room temperature and then extracted with 250 ml. of ether. The ether extract was washed with 250 ml. of water, dried over sodium sulfate and the solvent stripped at a maximum temperature of 100° C. at 14 mm. pressure. The oil which separated initially solidified on standing and was dried on a porous plate. The 2,4-dichlorophenyl 4-(2,6-dimethyl)morpholinecarbothionate was a pale yellow solid melting at 82–84° C. after recrystallization from ethanol. Analysis gave 22.1% chlorine, 10.5% sulfur and 4.3% nitrogen as compared to calculated values of 22.1% chlorine, 10.0% sulfur and 4.4% nitrogen.

EXAMPLE 15

In the procedure of Example 14, 29.9 grams (0.2 mole) of 1-pyrrolidinethiocarbonyl chloride was substituted for the 4 - (2,6 - dimethyl)morpholinethiocarbonyl chloride. The 2,4-dichlorophenyl 1-pyrrolidinecarbothionate so obtained was a tan solid melting at 54–56° C. after recrystallization from ethanol. Analysis gave 24.3% chlorine, 12.1% sulfur and 4.9% nitrogen as compared to calculated values of 25.7% chlorine, 11.6% sulfur and 5.1% nitrogen.

EXAMPLE 16

To a stirred solution containing 12.9 grams (0.1 mole) of p-chlorophenol, 6.3 grams (0.1 mole) of 90% potassium hydroxide and 200 ml. of acetone was added dropwise at 25–30° C. a solution of 1-hexamethylenimine-thiocarbonyl chloride in 100 ml. of acetone. The mixture was then stirred at 25–30° C. for 24 hours whereupon 300 ml. of water and 300 ml. of ethyl ether were added and the solution stirred for 15 minutes. The ether solution was washed with water until neutral to litmus and dried over sodium sulfate. The ether was removed in vacuo at a maximum temperature of 80–90° C./1–2 mm. p-Chlorophenyl 1-hexamethyleniminecarbothionate was obtained in 98.8% yield as a dark amber liquid. Analysis gave 4.7% nitrogen, 11.9% sulfur and 14.1% chlorine compared to 5.2% nitrogen, 11.9% sulfur and 13.1% chlorine calculated for $C_{13}H_{16}ClNOS$.

EXAMPLE 17

In the procedure of Example 16, 16.3 grams (0.1 mole) of 2,4-dichlorophenol was substituted for the p-chlorophenol. 2,4-dichlorophenyl 1-hexamethylenimine-carbothionate was obtained in 95.5% yield as an amber oil. Analysis gave 4.8% nitrogen as compared to 4.6% calculated for $C_{13}H_{15}Cl_2NOS$.

The O-haloaryl aminocarbothionates of this invention are effective in either contact or pre-emergent application. Accordingly, by applying the toxicant to the plant is meant any means whereby the toxicant is brought into contact with living plants which latter include germinating seedlings, as for example by application to the ground before the plants emerge, or by direct application to the foliage. The toxicants may be applied in the form of a spray containing the active ingredient in a concentration within the range of 0.05%–5.0%. Thorough coverage of the foliage is effective for contact killing. For pre-emergent application amounts within the range of 1 to 60 pounds per acre will be adequate for most purposes. The active components are insoluble in water but they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzenesulfonate, or an amine salt thereof, alkali metal salts of sulfated fatty alcohols, ethylene oxide condensation products of alkyl phenols, tall oil, higher alcohols or higher mercaptans. The herbicides may be formulated and applied as dry compositions by mixing the toxicant with a finely divided solid carrier, as for example talc, pyrophyllite, silica and fuller's earth. Formulation of emulsifiable concentrates is feasible to provide compositions convenient for diluting to the concentration desired for application. For this purpose a petroleum base hydrocarbon solvent high in aromatic content is desirable as solvent carrier. A compatible emulsifying agent is added to aid in emulsifying in water.

From the standpoint of activity and weed specificity the new compounds are outstanding. They control two of the most prevalent broadleaf weed families, pigweed and lamb's-quarter. They also control three major midwest weedy grasses, crab grass, foxtail and barnyard grass. They are effective on all five plant species at rates down to 1 pound per acre and are effective on some of them at ½ pound per acre. Moreover, they are relatively non toxic to such crops as corn, radish, soybeans, snapbeans and carrots. To the list of weeds controlled may be added smartweed, curl dock, and sheep sorrel, all representatives of another one of the most prevalent weed families (Polygonaceae).

Table III illustrates the pre-emergent herbicidal activity of typical O-haloaryl aminocarbothionates. The ester was emulsified in water and the emulsion applied as a spray. In this manner, the active ingredient at a dosage of 5 pounds per acre was applied to the ground of seeded plots before the grass or other plants emerged. About fourteen days after application of the toxicants results were observed and recorded. The number of seeds emerging was converted to weighted herbicidal ratings based on average percent germination of any particular seed lot times an injury factor. This evened irregularities of herbicide ratings of seeds which varied in percent germination. The injury factor took into consideration any plants not expected to survive. Thus, phytotoxicity ratings were based on the number of plants which emerged and would survive as observed two weeks after planting. Herbicidal ratings were assigned by means of the following conversion scale.

| Percent emergence: | Phytotoxicity rating |
|---|---|
| 0–25 | 3 or severe. |
| 26–50 | 2 or moderate. |
| 51–75 | 1 or slight. |
| 76–100 | 0 or none. |

Table III

| Active Ingredient | Results Observed |
|---|---|
| p-Chlorophenyl 4-morpholinecarbothionate. | Severe phytotoxicity to rye grass, sugar-beet, barnyard grass, crab grass, pigweed and wild buckwheat; moderate phytotoxicity to wild oats, brome grass and tomato. |
| 2,4-dichlorophenyl 4-morpholinecarbothionate. | Severe phytotoxicity to foxtail, barnyard grass, pigweed and crab grass; moderate phytotoxicity to brome grass. |
| p-Bromophenyl 4-morpholinecarbothionate. | Severe phytotoxicity to brome grass, rye grass, sugar-beet, barnyard grass, crab grass, pigweed, tomato and wild buckwheat; moderate phytotoxicity to wild oats. |
| 2,4-dibromophenyl 1-pyrrolidinecarbothionate. | Severe phytotoxicity to brome grass, rye grass, barnyard grass, crab grass, pigweed and tomato. |
| p-Bromophenyl 1-pyrrolidinecarbothionate. | Severe phytotoxicity to wild oats, brome grass, rye grass, sugar-beet, barnyard grass, crab grass, pigweed, wild buckwheat and tomato. |
| p-Chlorophenyl 1-pyrrolidinecarbothionate. | Severe phytotoxicity to wild oats, brome grass, rye grass, radish (mustard), sugar-beet, barnyard grass, crab grass, pigweed, wild buckwheat, tomato and sorghum. |
| p-Fluorophenyl 4-morpholinecarbothionate. | Severe phytotoxicity to sugar-beet, barnyard grass, crab grass, pigweed, wild buckwheat and tomato; moderate phytotoxicity to sorghum. |
| 2,4-dichlorophenyl 1-pyrrolidinecarbothionate. | Severe phytotoxicity to brome grass, rye grass, sugar-beet, barnyard grass, crab grass, pigweed and sorghum; moderate phytotoxicity to wild oats and tomato. |
| 2,4,5-trichlorophenyl 1-pyrrolidinecarbothionate. | Severe phytotoxicity to brome grass, barnyard grass, crab grass, pigweed and tomato; moderate phytotoxicity to wild oats and rye grass. |
| p-Chlorophenyl 1-piperidinecarbothionate. | Severe phytotoxicity to rye grass, barnyard grass, crab grass and pigweed; moderate phytotoxicity to wild oats, tomato and sorghum. |

When tested at lower concentrations, the above compounds completely controlled barnyard grass and pigweed at one pound per acre.

A spray containing various concentrations of the active ingredient shown in Table IV was applied to the foliage of bean plants, to the foliage of a mixture of grasses and finally to the foliage of a mixture of broadleaved plants. The mixture is indicated in the table as "Broadleaf." A rating of 0 indicates no phytotoxicity, 1 slight, 2 moderate, 3 severe phytotoxicity, 4 plants dead and B defoliation.

Table IV

| Active Ingredient | Conc., percent | Phytotoxicity Rating | | |
|---|---|---|---|---|
| | | Bean | Grass | Broadleaf |
| p-Chlorophenyl 4-morpholinecarbothionate | 0.5 | 3 | 2 | 2 |
| | 0.2 | ²3B | 2 | 3 |
| | 0.05 | 1 | 1 | 2 |
| 2,4-dichlorophenyl 4-morpholinecarbothionate | 0.5 | 2 | 3 | 2 |
| | 0.2 | 2 | 2 | 3 |
| p-Bromophenyl 4-morphlinecarbothionate | 0.5 | 3 | 2 | 4 |
| | 0.2 | ¹3B | 3 | 2 |
| | 0.05 | ¹2B | 1 | 1 |
| p-Chlorophenyl 1-pyrrolidinecarbothionate | 0.5 | 3 | 3 | 3 |
| | 0.2 | 1 | 2 | 3 |
| p-Chlorophenyl 1-piperidinecarbothionate | 0.5 | 2 | 1 | 2 |
| p-Bromophenyl 1-pyrrolidinecarbothionate | 0.5 | 3 | 3 | 3 |
| | 0.2 | 3 | 2 | 3 |
| p-Fluorophenyl 4-morpholinecarbothionate | 0.5 | ¹2B | 1 | 2 |
| 2,4-dibromophenyl 1-pyrrolidinecarbothionate | 0.5 | 2 | 2 | 2 |

¹ 25% defoliation.
² 51-75% defoliation.

Table V illustrates the herbicidal activity of the compounds when applied to crab grass, wild oats, buckwheat and pigweed.

Table V

| Active Ingredient | Conc., Percent | Phytotoxicity Rating | | | |
|---|---|---|---|---|---|
| | | Crab Grass | Wild Oats | Buckwheat | Pigweed |
| p-Chlorophenyl 4-morpholinecarbothionate | 0.2 | 4 | | | |
| 2,4-dichlorophenyl 4-morpholinecarbothionate | 0.5 | 3 | 4 | 1 | |
| p-Bromophenyl 4-morpholinecarbothionate | 0.2 | 4 | 2 | 4 | |
| | 0.05 | | | 4 | |
| p-Chlorophenyl 1-pyrrolidinecarbothionate | 0.2 | | | 4 | |
| p-Bromophenyl 1-pyrrolidinecarbothionate | 0.2 | 4 | 1 | | |
| | 0.05 | 3 | | | |
| p-Chlorophenyl 1-hexamethyleniminecarbothionate | 0.5 | | | 4 | 4 |

Still further examples of the toxicants are p-chloro-o-tolyl-4-morpholinecarbothionate, o-chloro-p-tolyl-4-morpholinecarbothionate, and 2-bromo-4-tertiary butylphenyl-4-(2,6-dimethyl)morpholinecarbothionate. The presence of alkyl groups tends to alter the physical properties by lowering the melting point. For example, the last compound mentioned which was prepared by the process of Example 8, was an oil. Analysis gave 8.3% sulfur which is the same as the calculated value.

Table VI illustrates the pre-emergent herbicidal use of halophenyl carbothionates and demonstrates the necessity for substitution in the phenyl nucleus. The active ingredients were applied at a dosage of 25 pounds per acre to freshly seeded plots and phytotoxicity observed and recorded 14 days later in the manner previously described.

Table VI

| Active Ingredient | Results Observed |
|---|---|
| 2-bromo-4-tert.-butylphenyl 4-(2,6-dimethyl)morpholinecarbothionate. | Severe phytotoxicity to crab grass; moderate phytotoxicity to radish (mustard), sugar-beet barnyard grass, pigweed, tomato and sorghum. |
| o-Chlorophenyl 4-morpholinecarbothionate. | Severe phytotoxicity to wild oats, sugar-beet, barnyard grass, crab grass, pigweed and wild buckwheat; moderate phytotoxicity to radish (mustard). |
| Phenyl-4-morpholinecarbothionate | No phytotoxicity to any plants tested. |
| 2,4-dichlorophenyl 4-(2,6-dimethyl) morpholinecarbothionate. | Severe phytotoxicity to crab grass; moderate phytotoxicity to barnyard grass. |
| p-Chlorophenyl 4-(2,6-dimethyl morpholinecarbothionate. | Severe phytotoxicity to barnyard grass; moderate phytotoxicity to wild oats, rye grass and crab grass. |
| 2,4,6-trichlorophenyl 1-pyrrolidinecarbothionate. | Severe phytotoxicity to rye grass, and barnyard grass; moderate phytotoxicity to wild oats, pigweed and sorghum. |
| 2,4-dichlorophenyl 1-piperidinecarbothionate. | Severe phytotoxicity to crab grass, wild oats, rye grass, barnyard grass and sorghum. |
| 2,4-dichlorophenyl dipropylthionocarbamate. | No phytotoxicity to any plants tested. |

In general, the new compounds may be represented by the formula

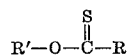

where R is piperidino, pyrrolidino, morpholino, 2- or 3-methylmorpholino, 2- or 3-ethylmorpholino, dimethylmorpholino, 2-, 3- or 4-methylpiperidino, dimethylpiperidino, as for example 2,3-, 2,4- or 2,6-dimethylpiperidino, ethylmethylpiperidino, as for example 5-ethyl-2-methylpiperidino, 5-ethyl-3-methylpiperidino, 2-ethyl-5-methylpiperidino, 2-ethyl-6-methylpiperidino, trimethylpiperidino, as for example 2,4,6-trimethylpiperidino, hexamethylenimino and N-methylpiperazino and R' is halophenyl as described above, alkoxyphenyl containing 1–4 carbon atoms inclusive in the alkoxy radical, 3,4-dimethoxyphenyl, 3,4-methylenedioxyphenyl, mononitrophenyl, methylphenyl providing that when p-substituted R is morpholino, dimethylmorpholino or pyrrolidino, and when o-substituted R is dimethylmorpholino, pyrrolidino or piperidino and alkylphenyl containing more than one but less than five carbon atoms in the alkyl radical providing R is pyrrolidino, piperidino or dimethylmorpholino.

The sub-class in which R is pyrrolidino may be represented by the formula

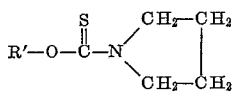

where R' represents phenyl substituted by lower alkyl, nitro or lower alkoxy radicals. Examples of R' comprise substituted phenyl radicals in which the substituents are methyl, ethyl, propyl, isopropyl, butyl, isobutyl, nitro, methoxy, ethoxy, propoxy, isopropoxy, butoxy and isobutoxy, as for example p-ethylphenyl, p-propylphenyl, o-ethylphenyl, m-ethylphenyl, 3,4-dimethoxyphenyl, 3,4-methylenedioxyphenyl, p-nitrophenyl, o-methylphenyl, p-ethoxyphenyl and o-ethoxyphenyl. Although other methods of synthesis are applicable, these compounds are readily obtained by condensing the appropriate alkali metal phenate with a pyrrolidinyl carbonyl halide.

EXAMPLE 18

To a stirred solution containing 24.4 grams (0.2 mole) of p-ethylphenol and 32.0 grams (0.2 mole) of 25% sodium hydroxide was added in one portion at 25° C. 29.9 grams (0.2 mole) of 1-pyrrolidinethiocarbonyl chloride in 80 ml. of acetone. The exothermic reaction caused a temperature rise to 45° C. and was kept there by cooling. When the temperature started to drop, the ice bath was removed, the product stirred for an additional 5 hours without heating or cooling and then 250 ml. of water added. The solution was extracted with 250 ml. of ether, the ether extract washed with water and dried. After removing the solvent, the p-ethylphenyl 1-pyrrolidinecarbothionate was obtained in 93.6% yield as an amber oil. Analysis gave 5.9% nitrogen and 13.5% sulfur as compared to 6.0% nitrogen and 13.6% sulfur calculated for $C_{13}H_{17}NOS$.

EXAMPLE 19

To a stirred solution containing 21.6 grams (0.2 mole) of p-cresol and 32.0 grams (0.2 mole) of 25% sodium hydroxide was added in one portion at 20° C. 29.9 grams (0.2 mole) of 1-pyrrolidinethiocarbonyl chloride, causing a temperature rise to 45–50° C. The product was stirred for 5 hours without heating or cooling and then 250 ml. of cold water added. The reaction mixture was stirred for 15 minutes longer and then extracted with 250 ml. of ether. The ether solution was washed with water, dried over sodium sulfate and the solvent removed by distillation at a maximum temperature of 100° C. at 14 mm. pressure. The p-methylphenyl 1-pyrrolidinecarbothionate was obtained in 97.2% yield as an amber oil. Analysis gave 6.2% nitrogen and 15.3% sulfur as compared to 6.3% nitrogen and 15.0% sulfur calculated for $C_{12}H_{15}NOS$.

EXAMPLE 20

In the procedure of Example 19, 21.6 grams (0.2 mole) of m-cresol was substituted for the p-cresol. The m-methylphenyl 1-pyrrolidinecarbothionate was obtained in 94.8% yield as an amber oil. Analysis gave 5.7% nitrogen as compared to 6.3% calculated for $C_{12}H_{15}NOS$.

EXAMPLE 21

In the procedure of Example 19, 21.6 grams (0.2 mole) of o-cresol was substituted for the p-cresol. The o-methylphenyl 1-pyrrolidinecarbothionate was obtained in 94.6% yield as an amber oil. Analysis gave 6.1% nitrogen and 15.3% sulfur as compared to 6.3% nitrogen and 14.5% sulfur calculated for $C_{12}H_{15}NOS$.

EXAMPLE 22

A solution was prepared by admixing 27.8 grams (0.2 mole) of p-nitrophenol, 32.0 grams (0.2 mole) of 25% sodium hydroxide in 50 ml. of water and 80 ml. of acetone. To the solution so prepared at room temperature was added in one portion 29.9 grams (0.2 mole) of 1-pyrrolidinethiocarbonyl chloride in 80 ml. of acetone. An exothermic reaction began immediately. The reaction mixture was stirred for 5 hours and then 250 ml.

of water added. The solid product which precipitated was removed by filtration, washed with water and air dried. The p-nitrophenyl 1-pyrrolidinecarbothionate obtained in 87.2% yield as an amber solid, M.P. 156–157° C. after recrystallization from ethyl acetate. Analysis gave 10.3% nitrogen and 13.0% sulfur as compared to 11.1% nitrogen and 12.7% sulfur calculated for $C_{11}H_{12}N_2O_3S$.

EXAMPLE 23

A solution was prepared by admixing 31 grams (0.25 mole) of p-methoxyphenol and 40 grams (0.25 mole) of 25% sodium hydroxide. To the solution so prepared there was added in one portion 37.4 grams (0.25 mole) of 1-pyrrolidinethiocarbonyl chloride slurried in 80 ml. of acetone. The exothermic reaction caused the temperature to rise to 40–50° C. The reaction mixture was stirred for 5 hours without heating or cooling, then 250 ml. of water added. The oil was extracted with 250 ml. of ethyl ether, the ether solution washed with water and dried over sodium sulfate. Removing the ether by distilling in vacuo (95–100° C./14 mm. Hg) left as the residue the desired p-methoxyphenyl 1-pyrrolidinecarbothionate. It was an amber oil obtained in yield of 87.7%. It contained 5.7% nitrogen and 14.2% sulfur as compared to 5.9% nitrogen and 13.5% sulfur calculated for $C_{12}H_{15}NO_2S$.

EXAMPLE 24

Substituting m-methoxyphenol for p-methoxyphenol in the procedure of Example 23 resulted in a 92.6% yield of m-methoxyphenyl 1-pyrrolidinecarbothionate. It was an amber oil which contained 5.9% nitrogen and 13.8% sulfur.

The lower alkyl-, nitro- and lower alkoxyphenyl 1-pyrrolidinecarbothionates also possess valuable biological activity. They are particularly useful for controlling vegetation by pre-emergent application to the soil medium. Some of these compounds are toxic to fungi. Amounts to be used for destroying vegetation and manner of formulation are similar to those described previously.

Table VII illustrates the pre-emergent herbicidal activity of typical aryl pyrrolidinecarbothionates. The ester was emulsified in water and the emulsion applied as a spray. In this manner, the active ingredient at a dosage of 25 pounds per acre was applied to the soil of seeded plots before the grass or other plants emerged. About fourteen days after application of the toxicants results were observed and recorded in the manner previously described. The following phytotoxicity ratings were observed:

The lower alkyl-, nitro- and lower alkoxyphenyl morpholinecarbothionates include phytotoxic substances but exhibit greater structural specificity than the corresponding pyrrolidine compounds. This sub-group possesses the formula

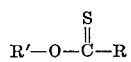

where R' represents phenyl substituted by lower alkyl, nitro or lower alkoxy radicals and R represents morpholino or lower alkyl substituted morpholino, as for example 2,6-dimethylmorpholino. Examples of R' comprise phenyl substituted by methyl in the p- or o-positions, ethyl, propyl, isopropyl, butyl and isobutyl with the proviso that when the substituent in R' is lower alkyl containing more than one carbon atom R is 2,6-dimethylmorpholino, nitro, methoxy, ethoxy, propoxy, isopropoxy, butoxy and isobutoxy radicals as for example 3,4-dimethoxyphenyl, 3,4-methylenedioxyphenyl, p-ethoxyphenyl and o-nitrophenyl. All of the examples illustrated herein are phytotoxic but are not necessarily equivalent.

EXAMPLE 25

To a stirred solution containing 24.4 grams (0.2 mole) of p-ethylphenol and 32.0 grams (0.2 mole) of 25% sodium hydroxide was added in one portion at 25° C. 38.7 grams (0.2 mole) of 4-(2,6-dimethyl)morpholinethiocarbonyl chloride in 80 ml. of acetone. The exothermic reaction caused a temperature rise to 45° C. and was kept there by cooling. When the temperature started to drop, the ice-bath was removed, the product stirred for an additional 5 hours without heating or cooling and then 250 ml. of water added. The solution was extracted with 250 ml. of ether, the ether extract washed with water and dried over sodium sulfate. The solvent was removed by distillation in vacuo at 100° C. (approximately 14 mm. Hg). The p-ethylphenyl 4-(2,6-dimethyl)morpholinecarbothionate was obtained in 91.2% yield as an amber oil. Analysis gave 4.8% nitrogen and 11.5% sulfur as compared to 5.0% nitrogen and 11.5% sulfur calculated for $C_{15}H_{21}NO_2S$.

EXAMPLE 26

To a stirred solution containing 21.6 grams (0.2 mole) of p-cresol and 32.0 grams (0.2 mole) of 25% sodium hydroxide was added in one portion at 20° C. 38.7 grams (0.2 mole) of 4-(2,6-dimethyl)morpholinethiocarbonyl chloride in 80 ml. of acetone, causing a temperature rise to 45–50° C. The product was stirred for 5 hours without heating or cooling and then 250 ml. of water added.

*Table VII*

| Active Ingredient | Results Observed |
| --- | --- |
| p-Ethylphenyl 1-pyrrolidinecarbothionate. | Severe phytotoxicity to brome-cheat grass, rye grass, sugar-beet, barnyard grass, pigweed, tomato and sorghum; moderate phytotoxicity to wild oats and wild buckwheat. |
| p-Methylphenyl 1-pyrrolidinecarbothionate. | Severe phytotoxicity to wild oats, brome-cheat grass, rye grass, mustard family, sugar-beet, barnyard grass, crab grass, pigweed, soybean, wild buckwheat, tomato and sorghum. |
| m-Methylphenyl 1-pyrrolidinecarbothionate. | Severe phytotoxicity to brome-cheat grass, rye grass, sugar-beet, barnyard grass, crab grass, pigweed, wild buckwheat and tomato; moderate phytotoxicity to mustard family and sorghum. |
| o-Methylphenyl 1-pyrrolidinecarbothionate. | Severe phytotoxicity to sugar-beet and pigweed; moderate phytotoxicity to crab grass, wild buckwheat and tomato. |
| p-Nitrophenyl 1-pyrrolidinecarbothionate. | Severe phytotoxicity to rye grass, sugar-beet, barnyard grass, crab grass and pigweed; moderate phytotoxicity to sorghum. |
| p-Methoxyphenyl 1-pyrrolidinecarbothionate. | Severe phytotoxicity to wild oats, brome-cheat grass, rye grass, mustard family, sugar-beet, barnyard grass, crab grass, pigweed, wild buckwheat, tomato and sorghum. |
| m-Methoxyphenyl 1-pyrrolidinecarbothionate. | Severe phytotoxicity to rye grass, barnyard grass, crab grass, pigweed and wild buckwheat; moderate phytotoxicity to wild oats, sugar-beet and sorghum. |

The solution was stirred for 15 minutes longer and then extracted with 250 ml. of ethyl ether. The ether solution was washed with water, dried over sodium sulfate and the solvent stripped at a maximum temperature of 100° C. at 14 mm. pressure. The p-methylphenyl 4-(2,6-dimethyl)morpholinecarbothionate was obtained in 94.3% yield as an amber oil. Analysis gave 5.1% nitrogen and 12.7% sulfur as compared to 5.3% nitrogen and 12.1% sulfur calculated for $C_{14}H_{19}NO_2S$.

EXAMPLE 27

A solution was prepared by admixing 27.8 grams (0.2 mole) of p-nitrophenol, 32.0 grams (0.2 mole) of 25% sodium hydroxide in 50 ml. of water and 80 ml. of acetone. To the solution so prepared at room temperature was added in one portion with stirring 33.1 grams (0.2 mole) of 4-morpholinethiocarbonyl chloride in 80 ml. of acetone. The exothermic reaction was stirred for 5 hours and then 250 ml. of water added. The water solution was filtered, the solid washed with water and air dried. The p-nitrophenyl 4-morpholinecarbothionate was obtained in 84.6% yield as a tan solid. After recrystallization from chloroform/heptane it melted at 184–186° C. Analysis gave 9.7% nitrogen and 12.2% sulfur as compared to 10.4% nitrogen and 12.0% sulfur calculated for $C_{11}H_{12}N_2O_4S$.

The physical properties of other typical examples prepared in similar manner are summarized below:

The toxicants may be applied in spray form. Amounts within the range of 1 to 60 pounds per acre will be adequate for most purposes.

Table IX illustrates typical pre-emergent herbicidal activity. The ester was emulsified in water and the emulsion applied as a spray. In this manner, the active ingredient at a dosage of 25 pounds per acre was applied to the ground of seeded plots before the grass or other plants emerged. About fourteen days after the application of the toxicants results were observed and recorded. The number of seeds emerging was converted to weighted herbicidal ratings based on average percent germination of any particular seed lot times an injury factor in the manner previously described. The following phytotoxicity ratings were observed:

*Table IX*

| Active Ingredient | Results Observed |
|---|---|
| p-Ethylphenyl 4-(2,6-dimethyl)-morpholinecarbothionate. | Severe phytotoxicity to wild oats, rye grass and soybean. |
| p-Methylphenyl 4-morpholinecarbothionate. | Severe phytotoxicity to rye grass, sugar-beet, barnyard grass, crab grass, pigweed, wild buckwheat and sorghum. |
| p-Nitrophenyl 4-morpholinecarbothionate. | Severe phytotoxicity to morning glory, sugar-beet, pigweed and tomato; moderate phytotoxicity to radish-mustard. |
| p-Methoxyphenyl 4-morpholinecarbothionate. | Severe phytotoxicity to rye grass, sugar-beet, barnyard grass, crab grass and pigweed; moderate phytotoxicity to brome-cheat grass, wild buckwheat and sorghum. |
| p-Methylphenyl 4-(2,6-dimethyl)-morpholinecarbothionate. | Severe phytotoxicity to pigweed; moderate phytotoxicity to barnyard grass. |
| m-Methylphenyl 4-(2,6-dimethyl)-morpholinecarbothionate. | Severe phytotoxicity to sugar-beet, pigweed and soybean. |
| o-Methylphenyl 4-(2,6-dimethyl)-morpholinecarbothionate. | Severe phytotoxicity to pigweed and sorghum; moderate phytotoxicity to crab grass. |
| m-Methylphenyl 4-morpholinecarbothionate. | Severe phytotoxicity to pigweed; moderate phytotoxicity to sugar-beet. |
| m-Methoxyphenyl 4-morpholinecarbothionate. | Severe phytotoxicity to pigweed and sorghum. |
| p-Nitrophenyl 4-(2,6-dimethyl)-morpholinecarbothionate. | Severe phytotoxicity to sugar-beet; moderate phytotoxicity to soybean. |
| Phenyl 4-morpholinecarbodithioate. | No phytotoxicity to any plants tested. |
| Methylphenyl 4-morpholinecarbodithioate. | No phytotoxicity to any plants tested. |

It will be noted that one oxygen atom in the acid radical is necessary for phytotoxicity.

Lower alkyl-, nitro- and lower alkoxyphenylpiperidinecarbothionates may be represented by the formula

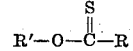

$$R'-O-\overset{\underset{\parallel}{S}}{C}-R$$

where R' represents phenyl substituted by lower alkyl, nitro or lower alkoxy radicals and R represents a six-membered heterocyclic hydrocarbon amino radical. Examples of R' comprise substituted phenyl radicals in which the substituents are methyl, ethyl, propyl, isopropyl, butyl,

*Table VIII*

| Example No. | Compound | Yield, percent | Physical Appearance | | Analysis, percent | |
|---|---|---|---|---|---|---|
| | | | | | Calcd. | Found |
| 28 | p-Methylphenyl 4-morpholinecarbothionate. | 86.5 | Amber oil | N | 5.9 | 5.6 |
| | | | | S | 13.5 | 12.7 |
| 29 | m-Methylphenyl 4-morpholinecarbothionate. | 92.6 | do | N | 5.9 | 5.6 |
| | | | | S | 13.5 | 13.1 |
| 30 | m-Methylphenyl 4-(2,6-dimethyl)-morpholinecarbothionate. | 90.5 | do | N | 5.3 | 5.1 |
| | | | | S | 12.1 | 11.8 |
| 31 | o-Methylphenyl 4-(2,6-dimethyl)-morpholinecarbothionate. | 90.5 | do | N | 5.3 | 5.0 |
| | | | | S | 12.1 | 11.4 |
| 32 | p-Nitrophenyl 4-(2,6-dimethyl)-morpholinecarbothionate. | 84.3 | Pale yellow solid, M.P. 124–126° C. | N | 9.4 | 9.0 |
| | | | | S | 10.8 | 11.5 |
| 33 | p-Methoxyphenyl 4-morpholinecarbothionate. | 94.0 | Tan solid M.P. 93–94° C. | N | 5.5 | 5.5 |
| | | | | S | 12.7 | 13.0 |
| 34 | m-Methoxyphenyl 4-morpholinecarbothionate. | 80.7 | Amber oil | N | 5.5 | 5.0 |
| | | | | S | 12.7 | 11.7 |

The lower alkyl-, nitro- and lower alkoxyphenyl morpholinecarbothionates herein described have the property of destroying vegetation in pre-emergent application. Pigweed is especially sensitive to the methylphenyl and methoxyphenyl esters, which esters are also toxic to fungi.

isobutyl, nitro, methoxy, ethoxy, propoxy, isopropoxy, butoxy and isobutoxy, as for example p-ethylphenyl, 3,4-dimethoxyphenyl, 3,4-methylenedioxyphenyl, p-nitrophenyl and o-methylphenyl. Examples of R comprise piperidino, 5-ethyl-2-methylpiperidino and 2-methylpiperidino.

EXAMPLE 35

To a stirred solution of 24.4 grams (0.2 mole) of p-ethylphenol, in 32 grams (0.2 mole) of 25% sodium hydroxide was added in one portion 32.7 grams (0.2 mole) of 1-piperidinethiocarbonyl chloride in 80 ml. of acetone. An exothermic reaction set in but the temperature was kept from rising above 45° C. by cooling with an ice bath. When the temperature started to drop, the ice bath was removed and the reaction mixture stirred for an additional 5 hours without heating or cooling. After adding 250 ml. of water the reaction mixture was extracted with ethyl ether. The ether extracts were dried over sodium sulfate and the solvent removed by distillation in vacuo (100° C./14 mm. of Hg). p-Ethylphenyl 1-piperidinecarbothionate was obtained in 87.2% yeild as an amber oil. It contained 5.2% nitrogen as compared to 5.7% calculated for $C_{14}H_{19}NOS$.

The physical properties of other typical examples prepared in similar manner are summarized below:

Table X

| Example No. | Compound | Yield, Percent | Physical Appearance | | Analysis, Percent | |
|---|---|---|---|---|---|---|
| | | | | | Calcd. | Found |
| 36 | m-Methylphenyl 1-piperidinecarbothionate. | 87.3 | Amber oil | N | 5.9 | 6.0 |
| | | | | S | 13.6 | 13.6 |
| 37 | o-Methylphenyl 1-piperidinecarbothionate. | 86.3 | do | N | 5.9 | 5.8 |
| | | | | S | 13.6 | 13.6 |
| 38 | p-Nitrophenyl 1-piperidinecarbothionate. | 97.5 | Tan solid M.P. 106–107 from ethanol. | N | 10.5 | 9.6 |
| | | | | S | 12.0 | 12.5 |
| 39 | p-Methoxyphenyl 1-piperidinecarbothionate. | 94.0 | Amber oil | N | 5.6 | 5.4 |
| | | | | S | 12.7 | 12.8 |
| 40 | m-Methoxyphenyl 1-piperidinecarbothionate. | 95.5 | do | N | 5.6 | 5.4 |

The lower alkyl-, nitro- and lower alkoxyphenyl piperidinecarbothionates also possess useful biological activity. The foregoing examples of this class are valuable for controlling cereal rusts or other fungus diseases. The presence of the substituents in the phenyl ring supports the biological activity.

Typical of the effectiveness of the products of the present invention as fungicides is the action of the new materials in protecting against the destructive action of the organism *Puccinia rubigo-vera tritici*. In demonstrating this effectiveness a rust susceptible variety of wheat (Seneca) was planted in small clay pots filled with soil. About ten seeds were normally planted in each pot so to insure availability of five uniform plants for the test. The pots were held in a greenhouse at 75° F. and watered daily until the seedlings were six days old. Thereupon the seedlings were sprayed with water by means of an atomizer and "bloom" removed from the leaves by gentle rubbing. Then rust spores were transferred to the leaves and rubbed up and down the leaves. Four days after inoculation with rust spores, the plants were sprayed with solutions of the chemical under test, prepared in concentrations of from 1 to 5 parts chemical to 1000 parts of water which contained a small quantity (5 parts) of acetone if the chemical was not water soluble. A trace of a suitable spreading or wetting agent preferably was also present. The plants were sprayed in duplicate tests using 10 cc. of the test solution per pot. After treatment as described, the pots were held in the greenhouse for a week and examined and graded as to the number and size of pustules formed on the leaves. The products of Examples 19, 20, 24, 27, 29, 34, 35, 36, 37 and 38 hereinbefore described, taken as typical of the products herein disclosed, in concentrations between 1 to 5 parts per 1000, that is of from 0.1 to 0.5% by weight, showed good results as eradicants of foliage wheat rust. There was also from no to very slight injury of the leaves. Although the alkyl-, nitro- and alkoxyphenyl piperidinecarbothionates are in general innocuous to foliage, the products of Examples 37–40 are useful pre-emergence herbicides. They destroy germinating pigweed seedlings at a dosage of 25 pounds per acre. On the other hand, phenyl piperidinecarbothionate was without effect either as pre-emergence herbicide or fungicide.

It is intended to cover all changes and modifications of the examples of the invention herein chosen for purposes of disclosure which do not constitute departures from the spirit and scope of the invention.

What is claimed is:

1. A thionocarbamate of the formula selected from the group consisting of:

(a) 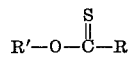
$$R'-O-\overset{\overset{\displaystyle S}{\|}}{C}-R$$

where R is selected from a group consisting of piperidino, pyrrolidino, morpholino, 2-methylmorpholino, 3-methylmorpholino, 2 - ethylmorpholino, 3 - ethylmorpholino, 2,5-dimethylmorpholino, 3,5-dimethylmorpholino, methylpiperidino, 2,3-dimethylpiperidino, 2,4-dimethylpiperidino, 2,6-dimethylpiperidino, 5-ethyl-2-methylpiperidino, 5 - ethyl-3-methylpiperidino, 5-methyl-2-ethylpiperidino, 2-ethyl-5-methylpiperidino, 2 - ethyl-6-methylpiperidino, 2,4,6 - trimethylpiperidino, hexamethylenimino, and N-methylpiperazino and R' is selected from a group consisting of monochlorophenyl, p-chloro-o-tolyl, o-chloro-p-tolyl, 2-bromo-4-butylphenyl, 2,4-dichlorophenyl, 3,4-dichlorophenyl, 3,5-dichlorophenyl, 2,3-dichlorophenyl, monoalkoxyphenyl of 1–4 carbon atoms, inclusive, in said alkoxy, 3,4-dimethoxyphenyl, 3,4-methylenedioxyphenyl, mononitrophenyl, and m-methylphenyl;

(b) 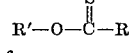
$$R'-O-\overset{\overset{\displaystyle S}{\|}}{C}-R$$

where R is selected from a group consisting of piperidino, pyrrolidino, morpholino, 2-methylmorpholino, 3-methylmorpholino, 2 - ethylmorpholino, 3 - ethylmorpholino, methylpiperidino, 2-3-dimethylpiperidino, 2,4-dimethylpiperidino, 2,6-dimethylpiperidino, 5-ethyl-2-methylpiperidino, 5 - ethyl-3-methylpiperidino, 5-methyl-2-ethylpiperidino, 2-ethyl-5-methylpiperidino, 2 - ethyl-6-methylpiperidino, 2,4,6 - trimethylpiperidino, hexamethylenimino, and N-methylpiperazino and R' is selected from the group consisting of monobromophenyl and monofluorophenyl;

(c) 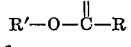
$$R'-O-\overset{\overset{\displaystyle S}{\|}}{C}-R$$

where R is selected from a group consisting of piperidino, pyrrolidino, methylpiperidino, 2,3-dimethylpiperidino, 2,4-dimethylpiperidino, 2,6-dimethylpiperidino, 5-ethyl-2-methylpiperidino, 5-ethyl-3-methylpiperidino, 5-methyl-2-ethylpiperidino, 2-ethyl-5-methylpiperidino, 2,6 - methylpiperidino, 2,4,6 - trimethylpiperidino, hexamethylenimino, and N-methylpiperazino and R' is selected from a group consisting of 2,4-dibromophenyl and 2,4-difluorophenyl;

(d) 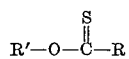

where R is pyrrolidino and R' is selected from a group consisting of 2,3,4-, 2,3,5-, 2,3,6-, 2,4,5-, and 2,4,6-trihalophenyl, the halogen being selected from a group consisting of chlorine, bromine, and fluorine;

(e) 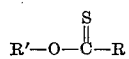

where R is selected from a group consisting of morpholino, 2,6-dimethylmorpholino, 3,5-dimethylmorpholino, and pyrrolidino and R' is p-methylphenyl;

(f) 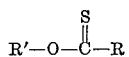

where R is selected from a group consisting of 2,6-dimethylmorpholino, 3,5-dimethylmorpholino, pyrrolidino, and piperidino and R' is o-methylphenyl;

(g) 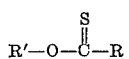

where R is selected from a group consisting of pyrrolidino, piperidino, 2,6-dimethylmorpholino, and 3,5-dimethylmorpholino and R' is alkylphenyl of more than one but less than five carbon atoms in said alkyl.

2. A compound of the formula

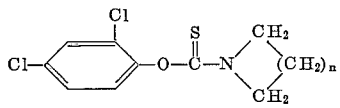

where $n$ is an integer at least 2 but not more than 4.

3. A halogen substituted phenyl ester of a thionocarbamic acid of the formula

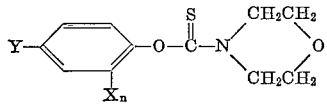

where X and Y represent chlorine and $n$ represents an integer from zero to one inclusive.

4. p-Chlorophenyl 4-morpholinecarbothionate.

5. p-Bromophenyl 4-morpholinecarbothionate.
6. p-Bromophenyl 1-pyrrolidinecarbothionate.
7. 2,4-dihalophenyl 1-pyrrolidinecarbothionate.
8. p-Chlorophenyl 1-pyrrolidinecarbothionate.
9. A thionocarbamate of the formula

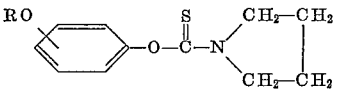

where R represents lower alkyl of 1 to 4 carbon atoms.

10. A thionocarbamate of the formula

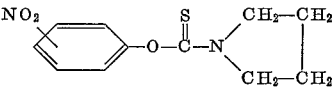

11. A thionocarbamate of the formula

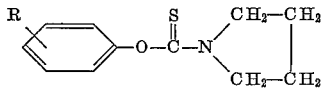

where R represents lower alkyl of 1 to 4 carbon atoms.

12. p-Methylphenyl 1-pyrrolidinecarbothionate.
13. A thionocarbamate of the formula

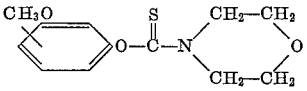

14. A thionocarbamate of the formula

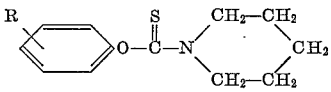

where R represents lower alkoxy of 1 to 4 carbon atoms.

15. p-Ethylphenyl 1-piperidinecarbothionate.

References Cited by the Examiner

UNITED STATES PATENTS

| | | | |
|---|---|---|---|
| 2,236,389 | 3/1941 | Williams | 260—239 |
| 2,941,879 | 6/1960 | Goodhue | 260—455 |
| 2,992,091 | 7/1951 | Harman et al. | 260—455 |

NICHOLAS S. RIZZO, *Primary Examiner.*

WALTER A. MODANCE, *Examiner.*